United States Patent Office 3,395,120
Patented July 30, 1968

---

3,395,120
EPOXY RESINS CONTAINING THE DIPHENYL OXIDE MOIETY
Bart J. Bremmer and Lawrence F. Sonnabend, Midland, Mich., assignors to The Dow Chemical Company, Midland, Mich., a corporation of Delaware
No Drawing. Filed Apr. 16, 1964, Ser. No. 360,443
8 Claims. (Cl. 260—47)

ABSTRACT OF THE DISCLOSURE

This application is concerned with a new class of epoxy resins derived from the epoxylation of a polyhydric phenolic compound produced by reacting a phenol with chloromethylated disphenyl oxide. The epoxy resins exhibit improved stability and resistance to decomposition when exposed to elevated temperatures for extended periods of time.

---

This invention relates to epoxy resins having an improved stability and resistance to decomposition when exposed to elevated temperatures for extended periods of time. More particularly, the invention concerns epoxy resins which contain one or more diphenyl oxide moieties in the polymer molecule. These resins can be cross-linked with any of the well-known epoxy resin curing agents to produce a thermoset material having the improved properties.

Polyhydric phenolic compounds containing the diphenyl oxide moiety can be obtained by reacting chloromethylated diphenyl oxide with either a monohydric phenol or with a dihydric phenolic compound. These polyhydric products are then reacted with epichlorohydrin to produce an epoxide.

The active chlorine atoms of chloromethylated diphenyl oxide can be reacted with nuclear hydrogen atoms of a phenolic compound to produce a polyhydric phenol having the following general structure:

$$H-A-CH_2-B-[CH_2-A-CH_2-B]_n-CH_2-A-H \quad (I)$$

where $n$ has an average value from 0 to 2, A is a divalent aromatic radical of the benzene series wherein each benzen ring bears a phenolic hydroxy group and B is the divalent diphenyl oxide moiety. The preparation of these polyhydric phenolic compounds is described in U.S. Patent 3,128,259. Sonnabend.

Phenolic compounds which can be reacted with chloromethylated diphenyl oxide to produce these polyhydric phenols are the hydroxylated aromatic compounds having at least two hydrogen atoms on the aromatic nucleus in positions activated by the phenolic hydroxyl group and are free of substituents other than halogen, alkyl, or aryl. Suitable hydroxylated aromatic compounds are phenol, o-chlorophenol, m-chlorophenol, dichlorophenol, trichlorophenol, alkylphenols, ethylphenol, octylphenol, p.-tert.-butylphenol, the cycloaliphatic phenols, cyclohexylphenols, o-cresol, p-cresol, m-cresol, bisphenols, disphenol, 2,2-bis(4-hydroxyphenyl)propane, bis(p-hydroxyphenyl)-methane, bis(o-hydroxyphenyl)methane, 2,2-bis(dichloro-p-hydroxyphenyl)propane, bis(p-hydroxyphenyl)ether, and the nuclear mono-, di- and polyhalogenated, alkylated and arylated derivatives thereof.

A polyhydric phenol according to Formula I produced by the reaction of phenol with chloromethylated diphenyl oxide is illustrated by the following formula:

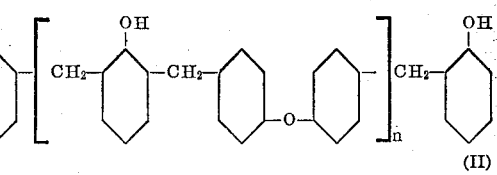

(II)

Another polyhydric phenol containing diphenyl oxide moieties useful in the preparation of resins according to this invention can be produced by the reaction of chloromethylated diphenyl oxide with a dihydric phenolic compound in the presence of a base such as sodium hydroxide or other alkaline earth metal hydroxides. Under these conditions the chloromethylated diphenyl oxide becomes attached to the phenolic compound at one of the hydroxyl groups forming an ether linkage and resulting in a product having terminal hydroxyl groups represented by the following general formula:

$$HO[D-O-CH_2-B-CH_2-O]_{n_1}D-OH \quad (III)$$

wherein B is the divalent diphenyl oxide moiety, D is the divalent internal aromatic moiety of the dihydric phenolic compound $n_1$ has an average value from 1 to 3.

Dihydric phenolic compounds which can be reacted with chloromethylated diphenyl oxide in the presence of a base to produce compounds according to general Formula III are resorcinol, hydroquinone, 4,4'-dihydroxyphenol)-2,2-bis(4-hydroxyphenyl)propane, bis(4-hydroxyphenyl)-methane, 1,1-bis(4-hydroxyphenyl)ethane, 1,1-bis(4-hydroxyphenyl)isobutane and the like.

The product corresponding to Formula III obtained by the reaction of chloromethylated diphenyl oxide and 2,2-bis(4-hydroxyphenyl)propane, known commercially as bisphenol A, is illustrated in the following formula:

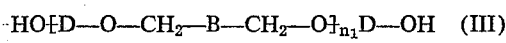

(IV)

The chloromethylated diphenyl oxide as well as the dihydric phenolic compounds which are reacted with it may be nuclearly substituted with halogens such as chlorine and bromine or with alkyl groups containing from 1 to about 6 carbon atoms. The nuclear halogenated products produce resins having improved flame retardant properties.

The polyhydric phenols are easily prepared. As taught in U.S. 3,128,259, the product corresponding to Formula II can be obtained by mixing phenol with chloromethylated diphenyl oxide and heating the mixture at a temperature in the range between 50 and 150° C. until there is no further evolution of hydrogen chloride, indicating the reaction is complete. The product represented by Formula IV may be prepared in a similar manner by reacting bisphenol A with chloromethylated diphenyl oxide in the presence of about 1 to about 1.2 stoichimetric amounts of a caustic such as NaOH to combine with the hydrogen and chlorine atoms removed from the hydroxyl and chloromethylated groups as the reaction proceeds.

The molecular weight of these polyhydric phenols i.e. the value of $n$ or $n_1$, depends primarily on the ratio of the chloromethylated diphenyl oxide to phenolic compound in the reaction mixture. General Formula I and III illustrate the alternating sequence of the phenolic and diphenyloxide moieties and the terminal phenolic hydroxyl groups in these products. Thus, the smallest molecular structure possible would be that containing two phenolic moieties and one of diphenyl oxide. If less than this ratio of diphenyl oxide is employed, all of the phenolic compound will not be reacted. The products where $n=2$ or $n_1=3$ are obtained from mixtures which contain more nearly equal molecular equivalents of the reactants, i.e. four equivalents of the phenolic compound per three equivalents of chloromethylated diphenyl oxide. Thus, the molecular weight of the product increases as the equivalent ratio of reactants approaches unity. Preferably the ratio of the equivalents of phenolic compound to the diphenyl oxide compound is greater than 1 and less than 2.

Chloromethylated diphenyl oxide may be prepared under conditions wherein the product either contains a single component or a mixture of mono-, di-, tri-, and tetrachloromethyl diphenyl oxide. The chloromethylated product containing from about 17 to 35 weight percent chlorine is suitable for reaction with the phenolic compound according to this invention. A typical analysis of a product containing about 25 weight percent chlorine is:

|  | Percent |
|---|---|
| Monochloromethyldiphenyl oxide | 6 |
| Dichloromethyldiphenyl oxide | 72 |
| Tri- and tetrachloromethyldiphenyl oxide | 18 |

The epoxylation of a polyhydric phenol of the type represented by Formula II where $n$ has an average value of about 0.5 is described in Example 1.

Example 1

The polyhydric phenol used in this example was produced by the reaction of phenol with chloromethylated diphenyl oxide containing about 25 percent chlorine, had a hydroxyl equivalent weight of 201, a molecular weight of 490, a functionality of 2.44 and a Durrans softening point of 59.2° C. 201 grams (1 equivalent) of the polyhydric phenol and 463 grams (5 equivalents) of epichlorohydrin were charged to a reaction vessel equipped with a stirrer, thermometer, addition funnel, condenser, and water separator. The mixture was heated to a temperature between 103 and 105° C. The addition of 90 grams of 50 percent sodium hydroxide in water (112 percent of theory) was started and slowly continued over a period of about 1.5 hours. During the caustic addition the temperature was maintained at 103–105° C. by the azeotropic removal of a water-epichlorohydrin mixture. After condensing and separating the mixture, the epichlorohydrin was returned to the reaction vessel. When all of the caustic had been added, the unreacted epichlorohydrin was removed by vacuum distillation. The product was then diluted with 600 ml. of toluene. The salt produced by the reaction was filtered out and the toluene removed by vacuum distillation. The product weighed 256 grams which was equal to 99.6 percent of the theoretical yield. The straw colored product had an epoxide equivalent weight of 275.

Example 2

An epoxy resin was prepared in the same manner as in Example 1 using a phenol-chloromethylated diphenyl oxide adduct containing about 17 percent chlorine and having a molecular weight of about 360. The epoxidation was conducted with one equivalent of the adduct and 5 equivalents of epichlorohydrin in the presence of 112 percent of the stoichiometric amount of 50 percent aqueous sodium hydroxide solution. The product, which had a Gardner viscosity of Z–4, had an epoxide equivalent weight (EEW) of 321 whereas the calculated EEW was 298.

Example 3

Another resin was prepared in the same manner as in Example 2 with the exception that the average molecular weight of the phenol-chloromethylated diphenyl oxide adduct was about 850 and the adduct contained about 25 percent chlorine. The product had an actual EEW of 316 compared with the calculated EEW of 281.

Example 4

Another resin prepared in the same manner as in Example 2 used the adduct of phenol and chloromethylated diphenyl oxide containing about 32 percent chlorine. The average molecular weight of the adduct was about 480. The viscous liquid epoxidized product had an actual EEW of 235 compared with a calculated EEW of 213.

The preparation of an epoxy resin utilizing a polyhydric phenol of the type illustrated in Formula IV is described in Example 5.

Example 5

456 grams (2 moles) of bisphenol A, 800 grams of water, and 88 grams of sodium hydroxide were heated to 70° C. A solution comprising 266 grams of 4,4′-dichloromethyldiphenyl oxide dissolved in 1000 grams of toluene was added to the heated mixture over a period of 30 minutes. The heating was continued for 35 minutes. At the end of that time hydrochloric acid was added to reach a pH of 7. Water was then removed as an azeotrope with toluene. The product was diluted with 150 grams of acetone then the sodium chloride was filtered out and the solvent stripped from the product with terminal conditions of 180° C. and 2.5 centimeters of mercury. The product polyhydric phenol weighed 641 grams and had a Durrans softening point of 96.5° C.

The polyhydric phenol was epoxylated according to the same procedure used in Example 1. 513.6 grams (1.6 equivalents) of the polyhydric phenol was charged to the reactor along with 1104 grams (12 equivalents) of epichlorohydrin and 133.1 grams (104 percent of the stoichiometric amount) of sodium hydroxide. The theoretical amount of epoxy resin was obtained having an epoxide equivalent weight of 457 and a Durrans softening point of 76.5° C.

These epoxy resins can be cured with the common curing agents such as polyamines, dicarboxylic acid anhydrides, glycols, and alcohol amines. Also, as in the case of the common epoxy resins such as the diglycidyl ether of bisphenol A, these resins can be reacted with a polyhydric phenol to produce higher melting solid resins which can be cured to a thermoset resin.

Polyhydric phenols which are suitable for producing these solid resins include those dihydric phenols heretofore named as co-reactants for chloromethylated diphenyl oxide in the preparation of resins of the type designated by Formula III. Also, polyhydric phenols such as the novolak resins which contain more than two hydroxyl groups may be used in the preparation of these solid resins. The preparation of a solid resin in this manner is as described in Example 6.

Example 6

350 grams of an epoxylated product similar to that obtained in Example 1 was charged to a reaction vessel along with 42.8 grams of bisphenol A. This mixture was heated to 110° C. under a nitrogen atmosphere and held at that temperature until it was thoroughly mixed. The temperature was reduced to 70° C. then 0.42 milliliter of triethylamine was added and the temperature raised slowly to 165° C. and held at that temperature for one hour. After subjecting the resin to a vacuum for 15 minutes to remove volatiles, the product was removed from the reactor and cooled. The resin which was obtained in 100 percent yield had a Durrans softening point of 73° C. and an epoxide equivalent weight of 462, compared with a calculated EEW of 444.

The reaction mixture of Example 6 contained approximately 0.3 hydroxyl equivalents per epoxy equivalent. Mixtures containing up to 0.6 hydroxyl equivalents per epoxy equivalent can be used without encountering difficulties owing to the rapid gellation produced by extensive cross-linking of the reactants.

Table 1 lists several resins which were prepared as in Example 6 by reacting an epoxylated product similar to that obtained in Example 1 with several polyhydric phenolic compounds in the presence of triethylamine.

TABLE 1.—SOLID EPOXY RESINS

| Sample No. | Polyhydric Phenol | Epoxy/Hydroxyl Ratio | EEW Calc. | EEW Actual |
|---|---|---|---|---|
| 1 | Bisphenol A | 1/0.3 | 444 | 46 |
| 2 | do | 1/0.456 | 610 | 646 |
| 3 | do | 1/0.586 | 697 | (*) |
| 4 | Adduct [1] | 1/0.17 | 386 | 389 |
| 5 | do [1] | 1/0.20 | 403 | 447 |
| 6 | do [1] | 1/0.22 | 418 | 467 |
| 7 | do [1] | 1/0.25 | 440 | 438 |
| 8 | Resorcinol | 1/0.227 | 380 | 386 |
| 9 | do | 1/0.346 | 458 | 488 |
| 10 | Hydroquinone | 1/0.346 | 458 | 497 |
| 11 | 3.5 Novolak [2] | 1/0.18 | 365 | 378 |

[1] Phenol-chloromethylated diphenyl oxide adduct similar to that used in Example 1.
[2] Novolak resin containing an average of 3.5 phenolic hydroxyl groups per molecule.
*Gelled.

The stability of these resins at high temperature as indicated by weight loss resulting from exposure at high temperature is illustrated in Tables 2 and 3. Epoxide novolaks are known to have superior high temperature properties, particularly when cured with an aromatic polyamine such as methylene dianiline. Samples of an epoxylated adduct of chloromethylated diphenyl oxide and phenol having an average molecular weight of 480 such as that prepared in Example 1 were mixed with methylenedianiline and boron trifluoride-monoethanolamine as curing agents then molded into small blocks and cured at an elevated temperature. These samples, along with those of an epoxy novolak which were cured in the same manner, were placed in an oven at 450° F. The samples were removed periodically and weighed to determine the weight loss with time at this high temperature. Table 2 lists these results which reveal approximately 50 percent less decomposition as indicated by weight loss in the samples prepared in accordance with this invention.

TABLE 2.— HIGH TEMPERATURE STABILITY OF RESINS

| Resin | Curing Agent | Percent Weight Loss After— | | | | |
|---|---|---|---|---|---|---|
| | | 26 hrs. | 50 hrs. | 74 hrs. | 100 hrs. | 125 hrs. |
| 438 | MDA | 1.27 | 2.57 | 3.98 | 4.60 | 5.10 |
| 480 | MDA | .72 | 1.16 | 1.82 | 2.18 | 2.62 |
| 438 | BF$_3$-MEA | 2.16 | 3.02 | 3.97 | 4.47 | 5.00 |
| 480 | BF$_3$-MEA | 1.27 | 1.73 | 2.25 | 2.45 | 2.75 |

438—Epoxylated novolak resin containing an average of 3.2 epoxy groups per molecule.
480—The epoxylated product of Example 1.
MDA—Methylenedianiline.
BF-MEA—Boron trifluoride-monoethanolamine.

Table 3 lists similar results for a normally solid epoxy resin obtained by the reaction of epichlorohydrin with bisphenol A and for solid resins produced according to this invention wherein the epoxylated adduct of phenol and chloromethylated diphenyl oxide is reacted with a polyhydric phenol in the presence of a tertiary amine to produce a higher molecular weight resin. The table lists the equivalents of the epoxylated adduct and the equivalents of the phenolic compound which were reacted together in the presence of the triethylamine. All of the samples in Table 3 were prepared according to the procedure of Example 6 but with other dihydric phenols, then cured with BF$_3$-monoethanolamine, producing thin disk-shaped samples about 1/16" thick and which were then stored in an oven at 450° F. These thin samples degrade and lose weight faster than the blocks of resin used in the tests reported in Table 2 so that the results of these tests are more accelerated than those of Table 2. Accordingly, a direct comparison of the two sets of data cannot be made. The results presented in Table 3 show the weight loss of these novel epoxy resins is approximately ½ that of the normally solid epoxy resin based on epichlorohydrin and bisphenol A. The weight percent of triethylamine (TEA) used to catalyze the reaction between the epoxy and phenolic compounds is listed in the table.

TABLE 3.—HIGH TEMPERATURE STABILITY OF RESINS CURED WITH BF$_3$·MEA

| Sample No. | Epoxy Equiv. | Phenolic Equiv. | TEA, wt. percent | Percent Weight Loss After— | | | |
|---|---|---|---|---|---|---|---|
| | | | | 6 hrs. | 24 hrs. | 48 hrs. | 120 hrs. |
| 1 | A | | | 3.18 | 7.39 | 9.20 | 11.44 |
| 2 | 1.25 B | 0.375 C | 0.077 | 1.28 | 2.59 | 3.65 | 5.05 |
| 3 | 0.5 B | 0.173 D | 0.077 | 2.55 | 4.34 | 5.39 | 7.11 |
| 4 | 0.5 B | 0.173 E | 0.077 | 1.66 | 3.00 | 4.05 | 5.43 |
| 5 | 0.25 B | 0.045 F | 0.077 | 1.45 | 2.56 | 3.40 | 4.65 |
| 6 | 0.125 B | 0.025 G | 0.108 | 1.70 | 2.91 | 3.78 | 4.94 |

A—Reaction product of epichlorohydrin and bisphenol A having an epoxide equivalent weight in the range 475–575.
B—The epoxylated product of Example 1.
C—Bisphenol A (2,2-bis(4-hydroxyphenyl)propane).
D—Resorcinol.
E—Hydroquinone.
F—Novolak resin having an average of 3.2 hydroxyl groups per molecule.
G—The adduct of phenol and chloromethylated diphenyloxide containing 25% chlorine, the adduct having an average molecular weight of 480.

Laminates were prepared with various of the resins produced according to this invention and their flexural strengths measured. A 1528 type of glass cloth having an A-1100 finish was impregnated with the experimental resins, B-staged, then laminated and cured. These resins were based on an epoxide corresponding to that produced in Example 1. Their compositions and properties are reported in Table 4. Samples 2 and 3 were the solid resins produced by reacting the epoxylated resin with a polyhydric compound. The curing agent and accelerator used to produce the thermalsetting are listed as parts per hundred parts resin (phr.).

TABLE 4.—FLEXURAL STRENGTHS OF CURED RESINS

| Sample No. | Polyhydric Phenol | Curing Agent phr. | Accelerator, phr. | Flexural Strength p.s.i. |
|---|---|---|---|---|
| 1 | None | DADS [1] 1.0 | $BF_3 \cdot MEA$ | 84,400 |
| 2 | Bisphenol A | DICY 4.0 | BDMA 0.2 | 98,270 |
| 3 | 3.2 Novolak | DICY 4.0 | BDMA 0.2 | 99,100 |

[1] 90% of theoretical amount.
DADS—Diamino diphenyl sulfone.
DICY—Dicyandiamide.
$BF_3$·MEA—Boron trifluoride-monoethanolamine.

From the foregoing it can be seen that these resins containing the diphenyl oxide moiety have superior resistance to thermal degradation, making them particularly suitable for potting, encapsulation, laminates, etc. where operation for extended periods at an elevated temperature is likely. The resins are basically polyepoxides, therefore any of the well-known epoxy curing agents may be used. Also, the resins may be used as coatings by first dissolving the resin and the curing agent in a volatile solvent then heating the body coated with this solution to remove the solvent and effect the cure.

We claim:

1. A thermosettable resin composed of the polyglycidyl ether of a polyhydric phenolic compound having the general structure $$H(O)_m A(O)CH_2—B—[CH_2(O)_m A(O)_m CH_2—B]—CH_2(O)_m A(O)_m H$$

wherein $n$ has a value from 0 to 2; $m$ has a value from 0 to 1; A is a divalent aromatic radical having at least one hydroxy on the aryl nucleus; and B is a diphenyl oxide moiety; said polyglycidyl ether produced by reacting at an elevated temperature of at least 50° C., said polyhydric phenolic compound with an excess over the equivalent amount of epichlorohydrin and an excess over the equivalent amount of an alkali metal hydroxide.

2. A thermosettable resin according to claim 1 wherein said polyhydric phenolic compound is

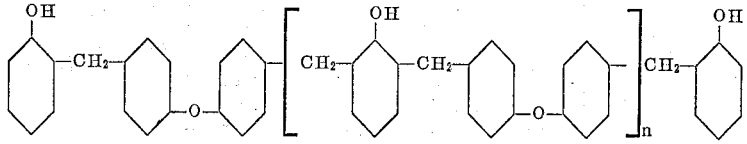

wherein $n$ has a value from 0 to 2.

3. A thermosettable resin according to claim 1 wherein said polyhydric phenolic compound is

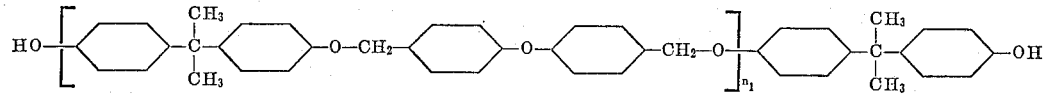

wherein $n_1$ has an average value from 1 to 3.

4. A thermosettable resin according to claim 1 wherein the epoxidized polyhydric phenolic compound is partially etherified with a polyhydric phenol in a ratio of not more than 0.6 phenolic hydroxy groups per epoxide group.

5. A resin according to claim 4 wherein said polyhydric phenol is 2,2-bis(4-hydroxyphenyl)propane.

6. A resin according to claim 4 wherein said polyhydric phenol is the reaction product of phenol and chloromethylated diphenyl oxide having an average molecular weight between about 350 and 850.

7. A resin according to claim 4 wherein said polyhydric phenol is hydroquinone.

8. A resin according to claim 4 wherein said polyhydric phenol is resorcinol.

References Cited

UNITED STATES PATENTS 2,668,807  2/1954  Greenless _____ 260—47
3,128,259  4/1964  Sonnabend _____ 260—18

WILLIAM H. SHORT, *Primary Examiner.*

T. D. KERWIN, *Assistant Examiner.*